United States Patent
Tao et al.

(10) Patent No.: US 12,246,296 B2
(45) Date of Patent: Mar. 11, 2025

(54) DEPOLYMERIZATION SYSTEM HAVING COIL-WOUND HEAT EXCHANGER

(71) Applicant: Zhenhai Petrochemical Jianan Engineering Co., Ltd., Ningbo (CN)

(72) Inventors: Jiang Tao, Ningbo (CN); Xianan Zhang, Ningbo (CN); Jianliang Wang, Ningbo (CN); Xingmiao Hu, Ningbo (CN); Li Wang, Ningbo (CN); Lijun Wu, Ningbo (CN); Chenyang Huang, Ningbo (CN)

(73) Assignee: Zhenhai Petrochemical Jianan Engineering Co., Ltd., Ningbo (CN)

( * ) Notice: Subject to any disclaimer, the term of this patent is extended or adjusted under 35 U.S.C. 154(b) by 648 days.

(21) Appl. No.: 17/597,841

(22) PCT Filed: Apr. 1, 2020

(86) PCT No.: PCT/CN2020/082664
§ 371 (c)(1),
(2) Date: Jan. 26, 2022

(87) PCT Pub. No.: WO2021/036257
PCT Pub. Date: Mar. 4, 2021

(65) Prior Publication Data
US 2022/0280905 A1 Sep. 8, 2022

(30) Foreign Application Priority Data
Aug. 23, 2019 (CN) .......................... 201910782344.5

(51) Int. Cl.
*B01J 19/24* (2006.01)
*B01J 19/00* (2006.01)
*F28D 7/02* (2006.01)
*F28D 21/00* (2006.01)

(52) U.S. Cl.
CPC .......... *B01J 19/0013* (2013.01); *B01J 19/24* (2013.01); *F28D 7/02* (2013.01); *B01J 2219/00081* (2013.01); *F28D 2021/0022* (2013.01)

(58) Field of Classification Search
CPC .................... B01J 19/0013; B01J 19/24; B01J 2219/00081; B01J 2219/00083; B01J 2219/00103; F28D 7/02; F28D 2021/0022; F28D 7/024; F28D 7/00; Y02W 30/62; F28F 9/027
USPC ........................................................ 422/201
See application file for complete search history.

(56) References Cited

FOREIGN PATENT DOCUMENTS

JP 6442639 B1 * 12/2018

OTHER PUBLICATIONS

JP-6442639 B1—machine translation (Year: 2024).*

* cited by examiner

Primary Examiner — Huy Tram Nguyen
(74) Attorney, Agent, or Firm — Wang Law Firm, Inc.

(57) ABSTRACT

A depolymerization system with a tube-wound heat exchanger (4) comprises a heat exchange device for heating a material, having a material output; a gas-liquid separation device (1) having an inlet and a gas output, connected to the material output of the heat exchange device; and a depolymerization device (2) connected to the gas output of the gas-liquid separation device (1); the heat exchange device comprises at least one tube-wound heat exchanger (4). The depolymerization rate is greatly improved and the service period of the whole depolymerization system can be greatly improved.

8 Claims, 9 Drawing Sheets

DEPOLYMERIZATION SYSTEM HAVING COIL-WOUND HEAT EXCHANGER

TECHNICAL FIELD OF THE INVENTION

The present invention belongs to the technical field of chemical equipment, and particularly relates to a depolymerization system with a tube-wound heat exchanger.

BACKGROUND OF THE INVENTION

The conventional depolymerization system mostly comprises an ordinary heat exchanger and a depolymerization device. As shown in FIG. 1, the ordinary heat exchanger is mostly a tubular heat exchanger 3', and the material is heated by the tubular heat exchanger 3' and then enters the depolymerization device 2' for depolymerization. However, the tubular heat exchanger 3' has low efficiency, low flow velocity, low material outlet temperature and low depolymerization conversion rate. For a material prone to depolymerization and polymerization, generally due to the low efficiency of the ordinary heat exchanger, circulating oil (generally a component from the bottom of the depolymerization device) can be added to the fresh material as a feed material, and only liquid-phase depolymerization can be performed. Since the used heating medium is high in temperature, the wall of the heat exchanger is high in temperature, so that the wall of the heat exchanger is prone to polymerization and coking. The gas obtained by separating the hot material from the material outlet of the tubular heat exchanger 3' by the gas-liquid separation device 1' enters the depolymerization device 2' for depolymerization.

In the prior art, a Chinese patent application CN105399590A (application No. is 201510691459.5 with entitled "METHOD FOR PREPARING DICYCLOPENTADIENE FROM C9 RAW MATERIAL BY GAS-LIQUID PHASE DEPOLYMERIZATION") discloses a device and method for depolymerization using a depolymerization system, wherein the method disclosed comprises steps of: rectifying and cutting the C9 raw material under reduced pressure to obtain a hot depolymerization raw material, and preheating and delivering into a depolymerization kettle R1; performing liquid-phase depolymerization to obtain a gasified material, and performing gas-phase depolymerization on the gasified material in the upper portion of the depolymerization reactor to obtain a gas-phase depolymerization material; making the gas-phase depolymerization material enter a tubular heat exchanger and heating for gas-phase depolymerization, and then making the gas-phase depolymerization material enter a cooling heat exchanger for heat exchange and cooling to obtain a gas-liquid phase material flow; making the material flow enter a rectification tower T1 and reacting on the top of the rectification tower T1 to obtain CPD, and making the CPD enter a dimerization reactor R2 for dimerization to obtain DCPD; and, making the DCPD enter a rectification tower T2 for rectification under reduced pressure, removing light components on the top of the tower and removing heavy components on the bottom of the tower to obtain dicyclopentadiene (DCPD). However, as mentioned in the description of this application, the heater in the upper portion of the depolymerization kettle R1 in this application supplies heat using a medium-temperature heat conducting oil, and the gas-phase material is partially depolymerized, is then extracted from the top of the reactor, enters a heat exchanger that supplies heat using a high-temperature heat conducting oil, and is heated to 290° C. to 310° C. for drastic depolymerization, so that the overall depolymerization rate of DCPD is improved. However, in the high-temperature gas-phase depolymerization, CPD and other active components are very easy to implode to form insoluble brown-yellow particles, resulting in the blockage of the heat exchanger. Therefore, this gas-phase depolymerization requires a very short retention time. Thus, in this application, since the tubular heat exchanger is used and the used heating medium is high in temperature, it is very easy to block the heat exchanger by polymerization, thereby affecting the operation period of the whole device. Moreover, the technological process adopted in this application is relatively complicated.

SUMMARY OF THE INVENTION

It is an object of the present invention to provide a depolymerization system with a tube-wound heat exchanger, which can improve the depolymerization rate and prolong the operation period of the device.

For achieving the object, the depolymerization system with a tube-wound heat exchanger comprises a heat exchange device for heating a material, having a material output; a gas-liquid separation device having an inlet and a gas output, connected to the material output of the heat exchange device; and a depolymerization device connected to the gas output of the gas-liquid separation device; wherein, the heat exchange device comprises at least one tube-wound heat exchanger;

each tube-wound heat exchanger comprises: a shell-pass cylinder having two ends; a first shell-pass connecting tube and a second shell-pass connecting tube both connected to the shell-pass cylinder; a first tube plate and a second tube plate both attached to the two ends of the shell-pass cylinder; a first tube box having a tube-pass inlet connecting tube disposed on the first tube plate; a second tube box having a tube-pass outlet connecting tube disposed on the second tube plate; a heat exchange tube having two ends disposed inside the shell-pass cylinder; wherein, a shell passage for a first heating medium to flow through is formed by the first shell-pass connecting tube, the second shell-pass connecting tube and the shell-pass cylinder; the heat exchange tube is spirally wounded with multiple tube layers, the two ends of the heat exchange tube is respectively connected to the first tube plate and the second tube plate, and respectively communicated with the first tube box and the second tube box; a tube passage for the material to pass through is formed by the first tube box, the second tube box and the heat exchange tube.

Preferably, the heat exchange device further comprises one tube-wound heat exchanger, the tube-pass inlet connecting tube receives the material, and the tube-pass outlet connecting tube is connected to the inlet of the gas-liquid separation device. When a single tube-wound heat exchanger is used for operation, the outlet temperature of the material can be increased, the depolymerization rate can be improved, and energy conversation and consumption reduction can be realized to the largest extent.

Preferably, the heat exchange device further comprises a tubular heat exchanger having a tube passage for the material to pass through and a shell passage for a second heating medium to flow through; the tube passage of the tubular heat exchanger is connected in series to the tube passage of the tube-wound heat exchanger, and the tube-pass inlet connecting tube of the tube-wound heat exchanger receives the material from the tube passage of the tubular heat exchanger.

Through the series connection of the tubular heat exchanger to the tube-wound heat exchanger, during the cleaning process, it is only necessary to clean the core of the tubular heat exchanger, so that the cleaning period is greatly shortened. Moreover, when one of the following three situations occurs, the series connection of the tubular heat exchanger to the tube-wound heat exchanger will not affect the production of the device and will also not cause serious blockage to the heat exchanger due to the fluctuation of working conditions: 1) when the load is not stable to ensure normal feeding; 2) when a single tube-wound heat exchanger needs to be taken out for cleaning; and, 3) when the feed composition of the material seriously deviates from the design conditions (particularly the increase of unsaturated hydrocarbon content and components).

Also preferably, the heat exchange device comprises at least two tube-wound heat exchangers, and the tube passages of the tube-wound heat exchangers are connected in series or in parallel to each other.

Preferably, the heat exchange device comprises a first tube-wound heat exchanger, a second tube-wound heat exchanger, and a third tube-wound heat exchanger; the tube passage of the first tube-wound heat exchanger is connected in parallel to the tube passage of the second tube-wound heat exchanger, and the tube passage of the first tube-wound heat exchanger and the tube passage of the second tube-wound heat exchanger both receive the material and are connected to the inlet of the gas-liquid separation device; the tube passage of the third tube-wound heat exchanger is connected in series to the tube passage of the first tube-wound heat exchanger; and a plurality of valves are respectively disposed at the tube-pass inlet connecting tubes and tube-pass outlet connecting tubes of the adjacent tube-wound heat exchangers. In this way, by controlling the opening or closing of each valve, the material can only pass through the tube passage of the first or second tube-wound heat exchanger, or the material can successively pass through the tube passages of the third and first tube-wound heat exchangers, so that it is convenient for an operator to make a choice according to actual working conditions. In addition, when a certain heat exchanger fails, another heat exchanger can be started by controlling the valves, without affecting the normal use.

In the present application, temperature and pressure detection devices are disposed at the tube-pass inlet connecting tube of the tube-wound heat exchanger and the first or second shell-pass connecting tube for allowing the heat exchange medium to enter.

In the above solutions, in order to avoid the deflection of the fluid in the shell passage, preferably, the central axis of the tube-pass inlet connecting tube coincides with the central axes of the first tube box and the shell-pass cylinder.

Due to the direct flow of the fluid at the tube-pass inlet connecting tube, this fluid is high in flow velocity and flow rate; however, the fluid entering the outer circle of the tube plate is low in flow velocity and flow rate. In order to enable the fluid to be distributed evenly and avoid coking due to the presence of low-flow-velocity regions, preferably, a spiral angle of the heat exchange tube in each tube layer is an included angle between the spiral line and the central axis of the shell-pass cylinder, which gradually decreases from the tube layer on the inner side to the tube later on the outer side. Thus, the pressure drop of the fluid in a single heat exchange tube gradually decreases, thereby guiding the fluid to flow to the peripheral region of the tube plate and improving the distribution and flow velocity of the fluid in the peripheral region.

In the above solutions, in order to dredge the coked medium conveniently, preferably, an edge manifold ring is disposed in the first tube box, and is located on the outer side of the end of the heat exchanger tube and adhered to the inner wall of the first tube box; a plurality of first dredge tubes are convexly disposed on an end face of the edge manifold ring facing the heat exchange tube at intervals in the circumferential direction, and the first dredge tubes extend into the heat exchange tube in the tube layer on the outer side;

or, a global manifold plate is disposed in the first tube box, and is located on the outer side of the end of the heat exchange tube, and the edge of the global manifold plate is adhered to the inner wall of the first tube box; a plurality of through holes for receiving the material are disposed on the global manifold plate at intervals, a plurality of second dredge tubes are convexly disposed on an end face of the global manifold plate facing the heat exchange tube at intervals, and the second dredge tubes extend into the heat exchange tube in each tube layer.

Preferably, the ratio of the outer diameter of the first dredge tubes or second dredge tubes to the inner diameter of the heat exchange tube is less than $3/8$. In this way, the dredge tubes can be inserted into the heat exchange tube to dredge the heat exchange tube, without affecting the flow of the fluid in the heat exchange tube.

In order to evenly distribute the fluid in the tube passage, preferably, the through holes are distributed on a plurality of concentric circumference lines using the medial axis of the global manifold plate as a center, and the density of the through holes on the concentric circumferential lines gradually increases from inside to outside.

Compared with the prior art, the present invention has the following advantages. Under the design of the tube-wound heat exchanger, the depolymerization system of the present application is suitable for depolymerization system units for preparing products by depolymerization after heating, that is, a process in which the material (raw material) is heated to a certain temperature in the heat exchanger and then depolymerized (a process of depolymerizing macromolecular substances into small molecules) and also absorbs heat, but a polymerization reaction will occur between the resulting products of depolymerization, between the resulting products and the material and between materials at a certain temperature to generate macromolecular compounds. The present application is particular suitable for processing and depolymerization systems for unsaturated hydrocarbons, for example, depolymerization systems for depolymerizing DCPD into CPD. At this time, the tube-wound heat exchanger also functions as a reactor (depolymerization kettle). In the prior art, although the tube-wound heat exchanger has become a conventional heat exchanger, the application of the tube-wound heat exchanger in the depolymerization system is limited since the tube-wound heat exchanger is difficult to clean. Therefore, tubular heat exchangers easy to clean are often used for heating.

Moreover, in accordance with the depolymerization system of the present application, the technological process is simplified, and it is unnecessary to add circulating oil with a high temperature. Compared with the use of only the tubular heat exchanger in the prior art, after the tube-wound heat exchanger is used, the temperature of the cold material is increased to 260° C. to 275° C. from original 220° C. under the action of the heating medium with the same temperature (305° C.), and the depolymerization rate is greatly improved. The operation period of a single tube-wound heat exchanger branch can be prolonged to above 12 months from original 30 days, and the operation period of two tube-wound heat exchangers connected in series can be prolonged to above 18 months from original 30 days (it is mainly limited by the first tube-wound heat exchanger). In addition, in order to realize the same heat exchange effect as a single tube-wound heat exchanger, when two tube-wound heat exchangers are connected in series, the length of the heat exchange tube in each tube-wound heat exchanger can be shortened, so that the cleaning time is greatly reduced and it is convenient for cleaning. Although the one-time investment cost for a single tube-wound heat exchanger is lower than that of two heat exchangers connected in series, by jointly using two heat exchangers, the service period of the whole depolymerization system can be greatly improved, and the whole system will not be shut down due to the blockage of the heat exchanger.

DETAILED DESCRIPTION OF THE INVENTION

Figure 1:
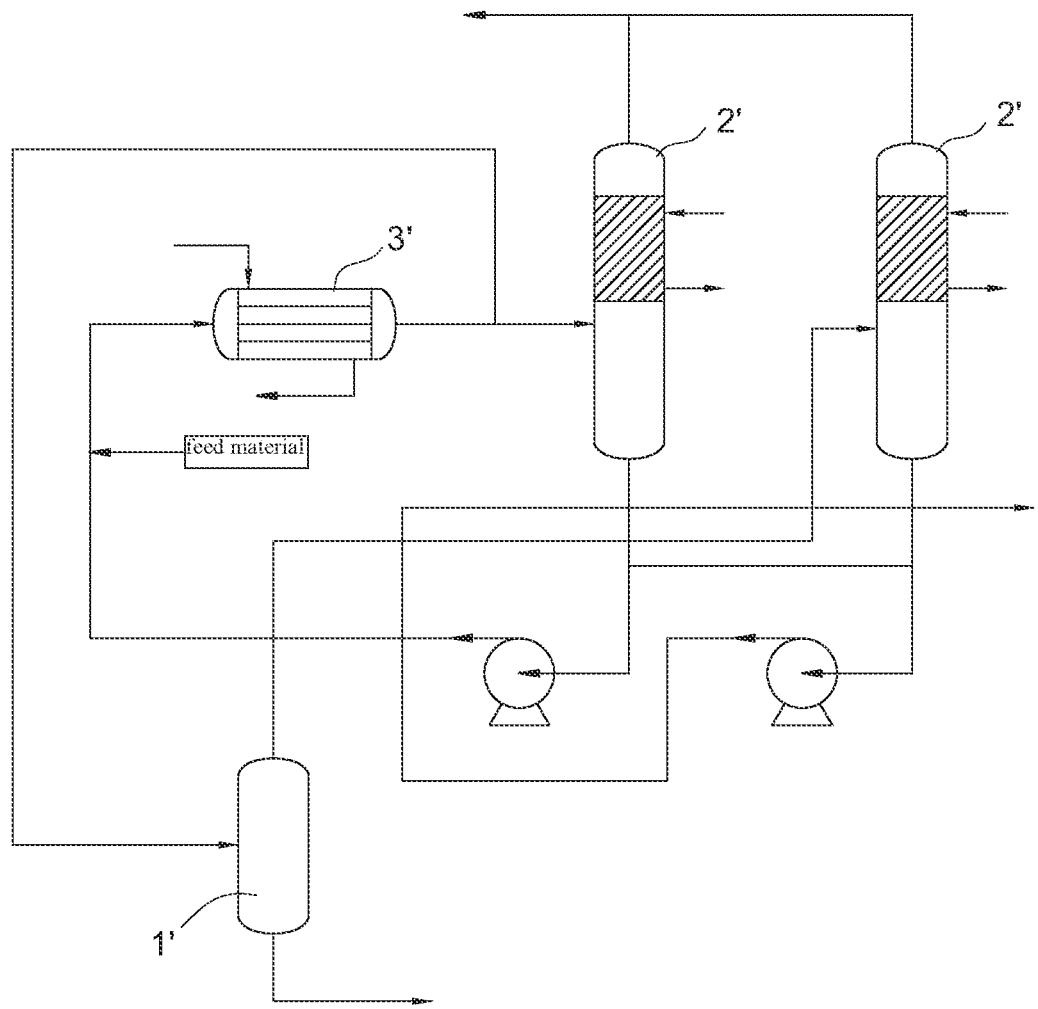
FIG. 1 is a diagram of a depolymerization system in the prior art.
Figure 2:
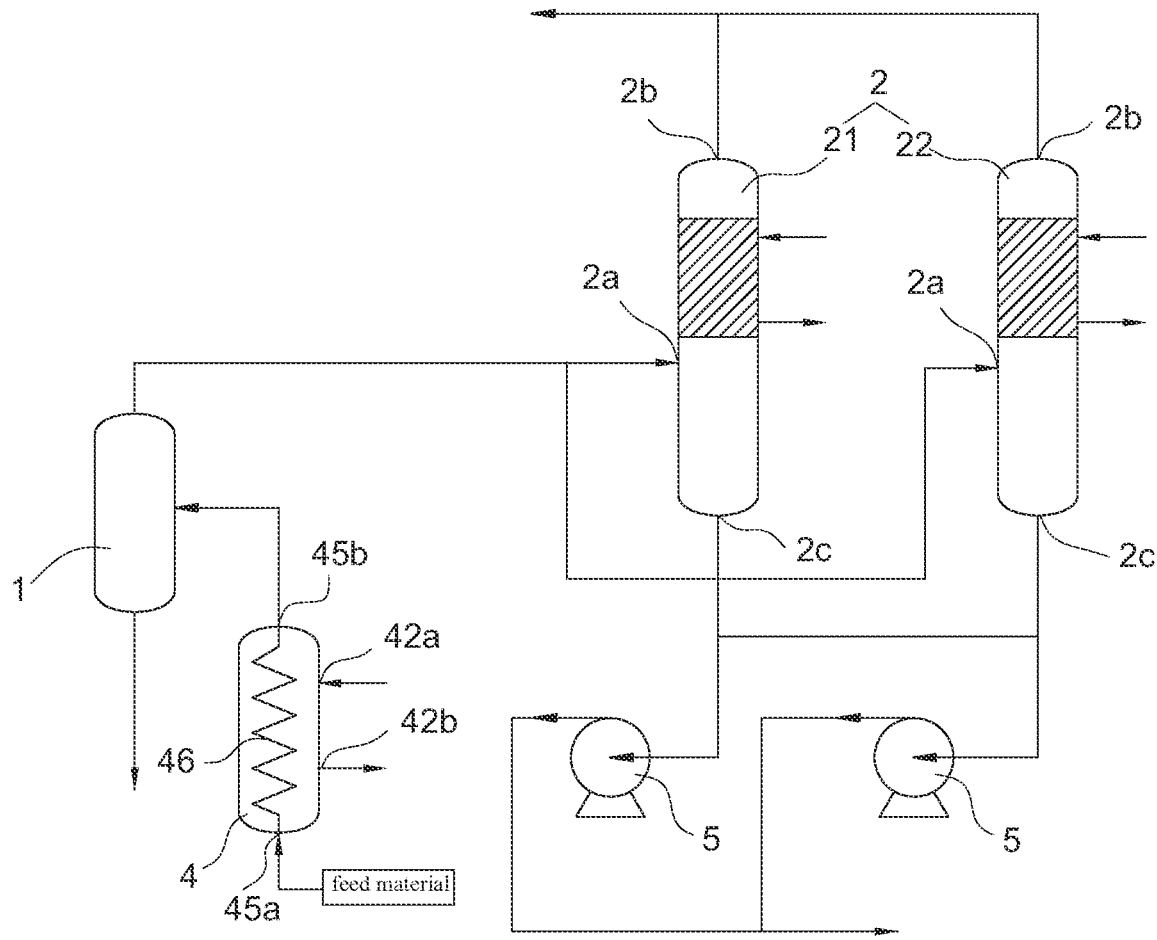
FIG. 2 is a diagram of a depolymerization system according to Embodiment 1 of the present invention.
Figure 3:
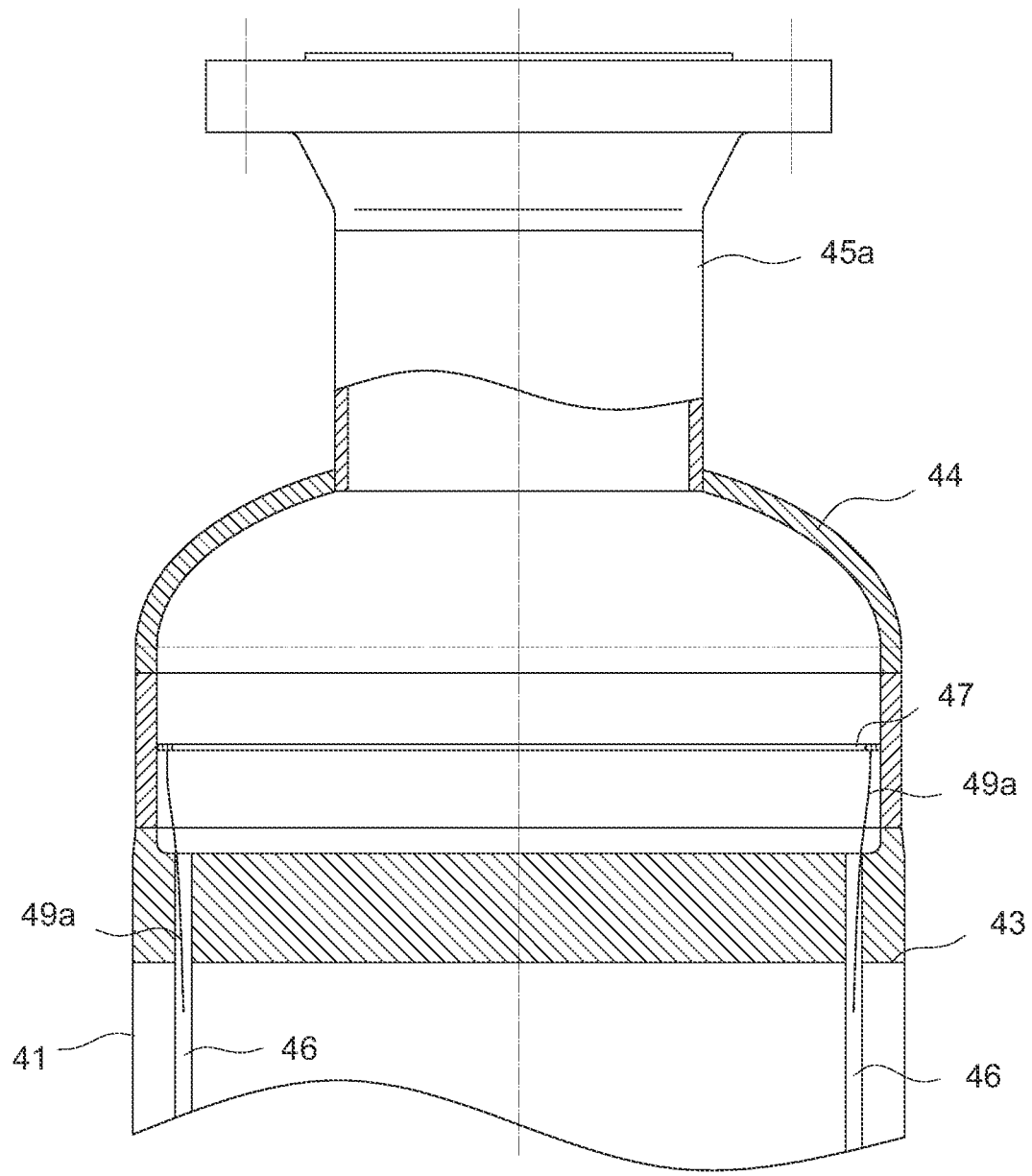
FIG. 3 is a partially sectional view of a tube-wound heat exchanger according to Embodiment 1 of the present invention.
Figure 4:
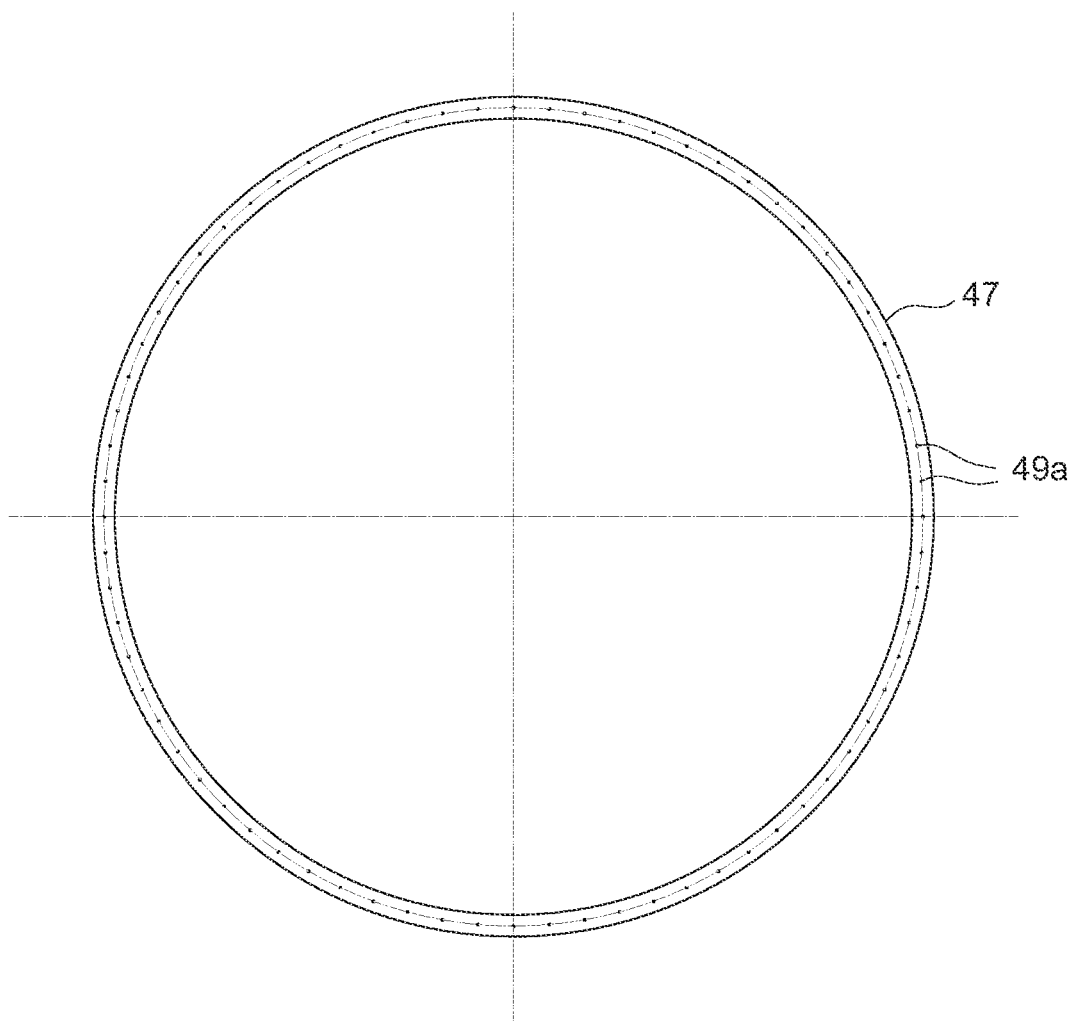
FIG. 4 is a perspective view of an edge manifold ring in FIG. 3.
Figure 5:
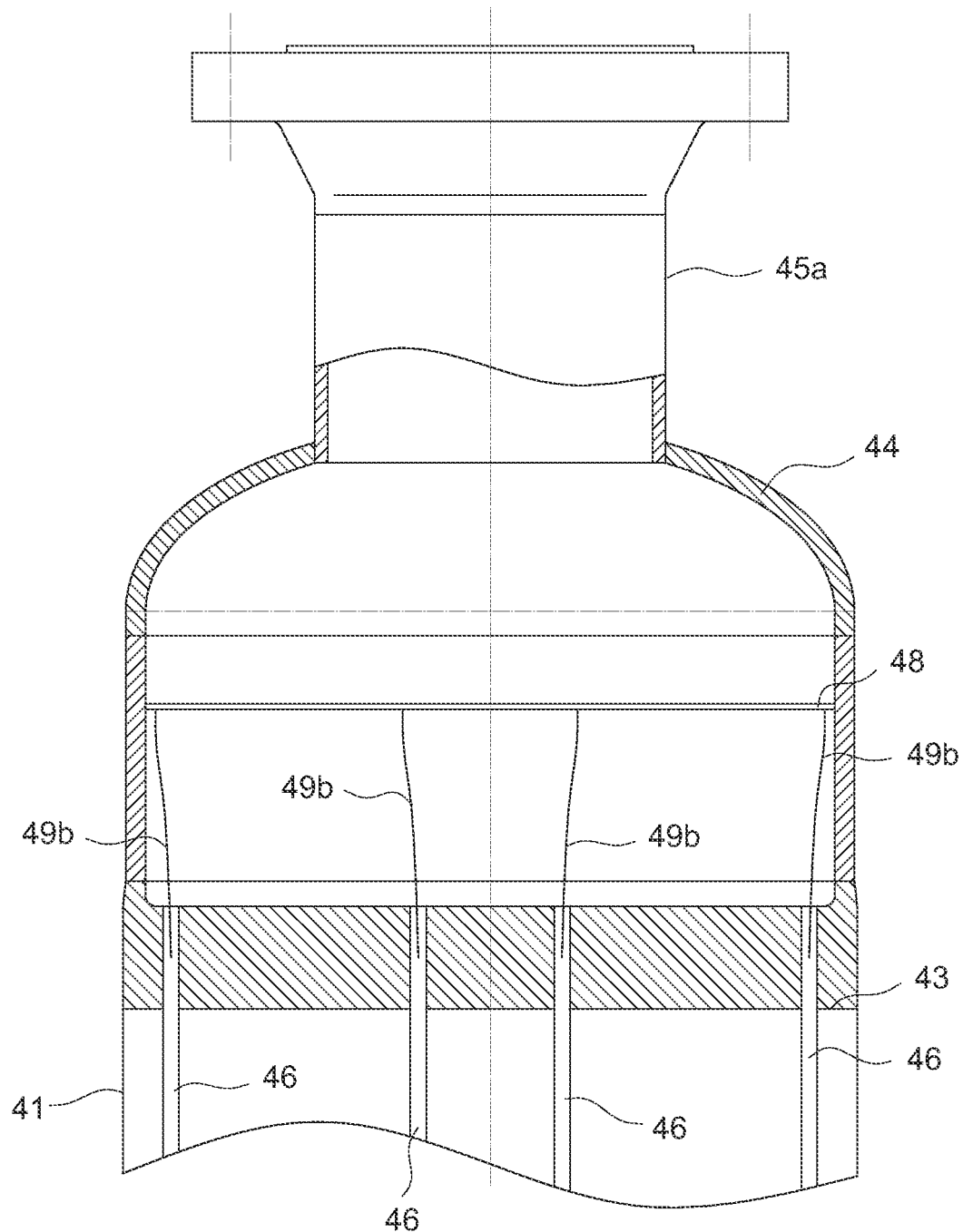
FIG. 5 is a partially sectional view of the tube-wound heat exchanger in another state according to Embodiment 1 of the present invention.
Figure 6:
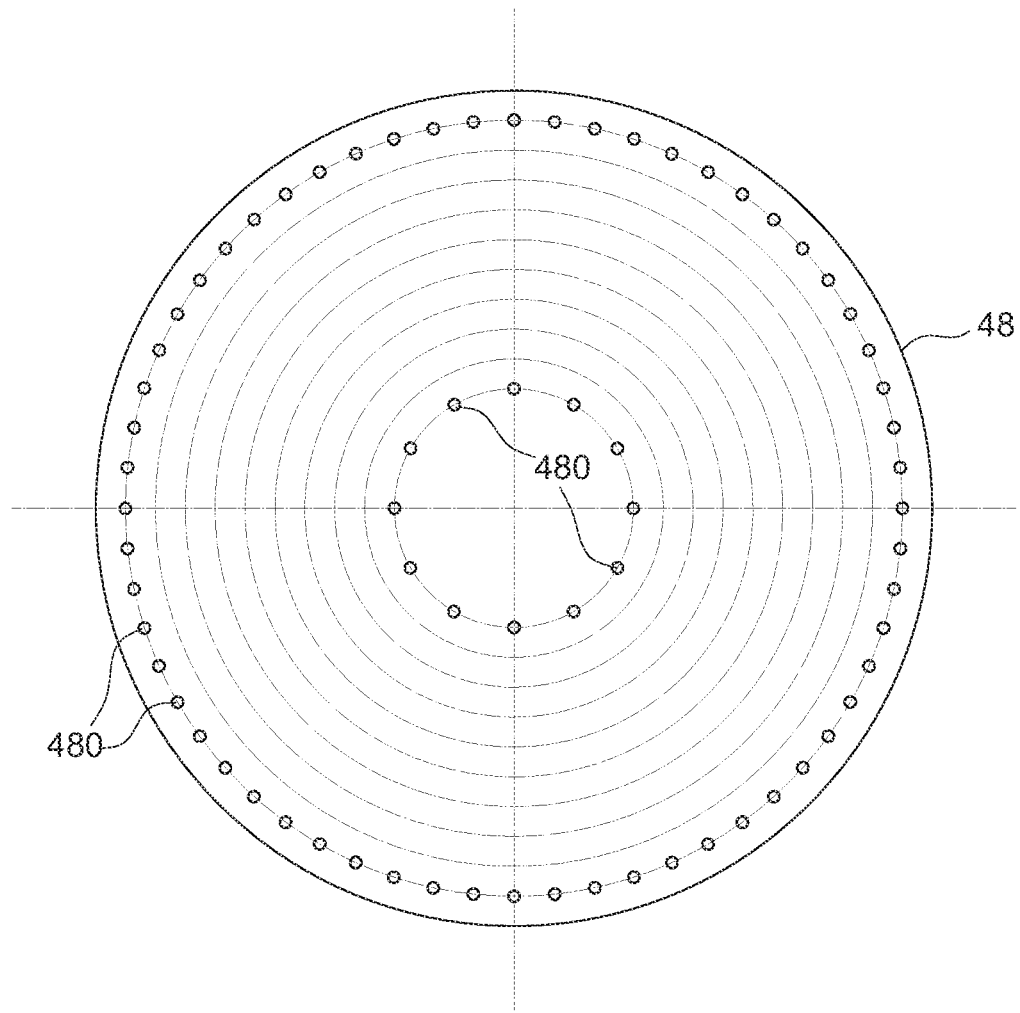
FIG. 6 is a perspective view of a global manifold ring in FIG. 5.
Figure 7:
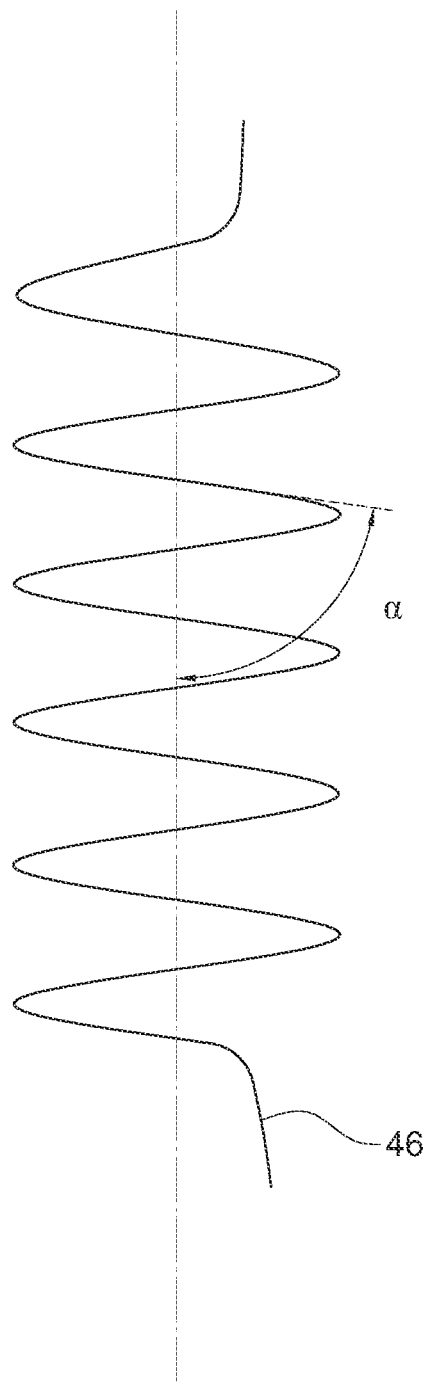
FIG. 7 is a diagram showing a spiral structure of a heat exchange tube according to Embodiment 1 of the present invention.

The present invention will be further described in detail below by embodiments with reference to the accompanying drawings.

Embodiment 1

FIGS. 2-7 show a first preferred embodiment of a depolymerization system with a tube-wound heat exchanger according to the present invention. The depolymerization system comprises a heat exchange device for heating a material, having a material output; a gas-liquid separation device 1 having an inlet and a gas output, connected to the material output of the heat exchange device; and a depolymerization device 2 connected to the gas output of the gas-liquid separation device 1; the heat exchange device comprises at least one tube-wound heat exchanger 4.

Each tube-wound heat exchanger 4 comprises: a shell-pass cylinder 41 having two ends; a first shell-pass connecting tube 42a and a second shell-pass connecting tube 42b both connected to the shell-pass cylinder 41; a first tube plate 43 and a second tube plate both attached to the two ends of the shell-pass cylinder 41; a first tube box 44 having a tube-pass inlet connecting tube 45a disposed on the first tube plate 43; a second tube box having a tube-pass outlet connecting tube 45b disposed on the second tube plate; a heat exchange tube 46 having two ends disposed inside the shell-pass cylinder 41; wherein, a shell passage for a first heating medium (the heating medium may be a heat conducting oil, vapor or the like, and the access temperature of the heating medium is selected according to actual working conditions) to flow through is formed by the first shell-pass connecting tube 42a, the second shell-pass connecting tube 42b and the shell-pass cylinder 41; the heat exchange tube 46 is spirally wounded with multiple tube layers, the two ends of the heat exchange tube 46 is respectively connected to the first tube plate 43 and the second tube plate, and respectively communicated with the first tube box 44 and the second tube box; a tube passage for the material to pass through is formed by the first tube box 44, the second tube box and the heat exchange tube 46. In this embodiment, each tube-wound heat exchanger is disposed vertically to save the floor space. Of course, each tube-wound heat exchanger may also be disposed transversely.

There may be one or more tube-wound heat exchangers 4. In this embodiment, in order to reduce the investment cost, the heat exchange device comprises one tube-wound heat exchanger 4, the tube-pass inlet connecting tube 45a receives the material, and the tube-pass outlet connecting tube 45b (that is, the material output end of the heat exchange device) is connected to the inlet of the gas-liquid separation device 1. The first shell-pass connecting tube 42a is connected to a heating medium so that the heating medium exchanges heat with the material in the tube passage and then leaves the shell passage from the second shell-pass connecting tube 42b.

The tube-wound heat exchanger in the present application can refer to the existing structure design, which can satisfy the requirements of the present application. Of course, preferably, in order to avoid the deflection of the material fluid in the shell passage, the central axis of the tube-pass inlet connecting tube 45a coincides with the central axes of the first tube box 44 and the shell-pass cylinder 41. Due to the direct flow of the fluid at the tube-pass inlet connecting tube, this fluid is high in flow velocity and flow rate and difficult to coke; however, and the fluid entering the region of the tube layer on the outer side is low in flow velocity and flow rate and easy to coke. In order to ensure the even distribution of the material fluid entering the tube passage, a spiral angle α of the heat exchange tube 46 in each tube layer is an included angle between the spiral line and the central axis of the shell-pass cylinder 41, which gradually decreases from the tube layer on the inner side to the tube later on the outer side, thereby guiding the material to flow the peripheral region of the tube layer on the outer side, improving the distribution and flow velocity of the fluid in the peripheral region and avoiding the coking of the heat exchange tube 46.

In order to dredge coked substances and further avoid the coking and blockage of the heat exchange tube 46, an edge manifold ring 47 or a global manifold plate 48 is further disposed. The selection of the edge manifold ring 47 and the global manifold plate 48 can be determined according to the specific structure of the tube-wound heat exchanger, specifically:

The edge manifold ring 47 is disposed in the first tube box 44, and is located on the outer side of the end of the heat exchanger tube 46 and adhered to the inner wall of the first tube box 44. That is, it can be seen from FIG. 3 that the edge of the edge manifold ring 47 is adhered and fixed to the inner wall of the first tube box 44. A plurality of first dredge tubes 49a are convexly disposed on an end face of the edge manifold ring 47 facing the heat exchange tube 46 at intervals in the circumferential direction, and the first dredge tubes 49a extend into the heat exchange tube 46 in the tube layer on the outer side. In this way, the coked substances in the heat exchange tube 46 in the tube layer on the outer side can be dredged, and the coked substances can be prevented from blocking the heat exchange tube 46, specifically referring to FIGS. 3 and 4.

Or, a global manifold plate 48 is disposed in the first tube box 44, and is located on the outer side of the end of the heat exchange tube 46, and the edge of the global manifold plate 48 is adhered to the inner wall of the first tube box 44; a plurality of through holes 480 for receiving the material are disposed on the global manifold plate 48 at intervals, a plurality of second dredge tubes 49b are convexly disposed on an end face of the global manifold plate 48 facing the heat exchange tube 46 at intervals, and the second dredge tubes 49b extend into the heat exchange tube 46 in each tube layer. In this way, the through holes 480 plays a role in distributing the fluid in the tube passage, and the led-out second dredge tubes 49b extend into each heat exchange tube 46 to dredge the coked substances. The specific details refer to FIGS. 5 and 6.

In this embodiment, in a state where the ratio of the flow area of the tube-pass inlet connecting tube 45a to the flow area of the first tube box 44 is greater than or equal to ⅓, the flow area of the tube-pass inlet connecting tube 45a is relatively large, the fluid at the tube-pass inlet connecting tube 45a is high in flow velocity and flow rate, and the corresponding heat exchange tube in the tube layer on the inner side is difficult to coke. However, the fluid entering the heat exchange tube 46 in the tube passage on the outer side is low in flow velocity and flow rate. Therefore, in order to avoid the coking and blockage of the heat exchange tube in the tube passage on the outer side, the edge manifold ring 47 is provided. In a state where the ratio of the flow area of the tube-pass inlet connecting tube 45a to the flow area of the first tube box 44 is less than ⅓, the flow area of the tube-pass inlet connecting tube 45a is relatively small, and it is necessary to distribute the fluid in the tube passage again. Therefore, the global manifold plate 48 is provided.

Of course, the selection of the global manifold plate 48 and the edge manifold ring 47 is not limited to the above conditions, and the user can selectively use or not use the global manifold plate 48 and the edge manifold ring 47 according to requirements and actual working conditions.

In order to better dredge the coked substances without affecting the entrance of the material into the heat exchange tube, the ratio of the outer diameter of the first dredge tubes or second dredge tubes to the inner diameter of the heat exchange tube is less than ⅜. In this embodiment, the first dredge tubes 49a or second dredge tubes 49b each have a surface roughness Ra of less than or equal to 1.6 and an outer diameter of $\varphi 1$ to $\varphi 3$; and the heat exchange tube has an inner diameter of greater than 8 mm. The dredge tubes are used to preliminarily dredge the coked substances in the heat exchange tube, and the coked substances are removed by cleaning the heat exchange tube. The cleaning of the heat exchange tube may be physical cleaning, chemical cleaning or other existing cleaning modes. In order to evenly distribute the material fluid, the through holes 480 are distributed on a plurality of concentric circumference lines using the medial axis of the global manifold plate 48 as a center; and, the density of the through holes 480 on the concentric circumferential lines gradually increases from inside to outside. Furthermore, the material can be guided to flow to the region of the tube layer on the outer side.

In this embodiment, the depolymerization device 2 comprises a first reactor 21 and a second reactor 22. Two material inlets 2a of the first reactor 21 and the second reactor 22 are connected to the gas output end of the gas-liquid separation device 1. Light components from two top material outlets 2b are gathered and connected to the downstream, and heavy components from two bottom material outlets 2c are gathered and connected to the downstream through two respective pumps 5.

Embodiment 2

Figure 8:
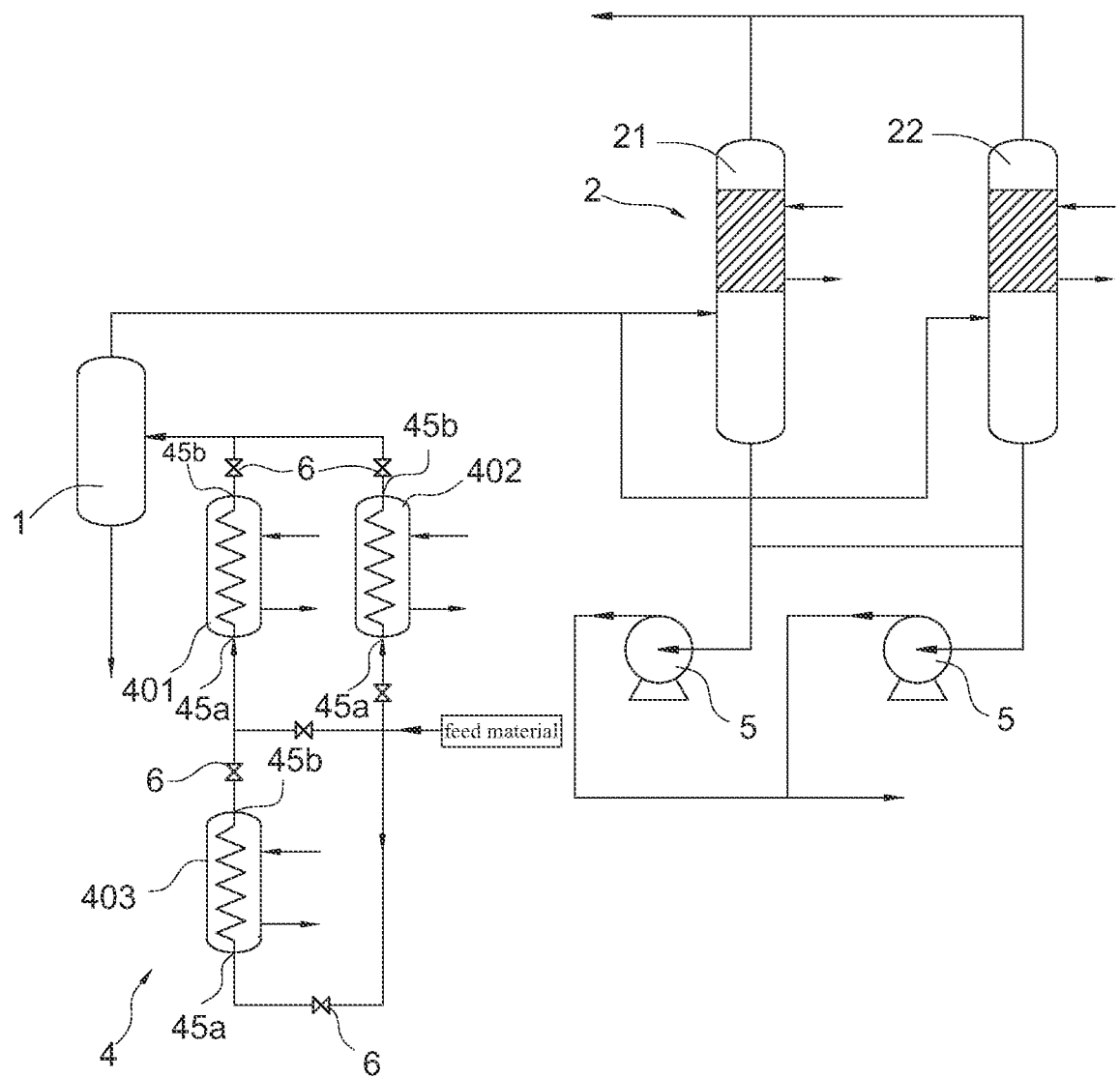
FIG. 8 is a diagram of a depolymerization system according to Embodiment 2 of the present invention.

FIG. 8 shows a second preferred embodiment of the depolymerization system according to the present invention. The depolymerization system is basically the same as that in Embodiment 1, the only difference is that the heat exchange device comprises at least two tube-wound heat exchangers 4 and the tube passages of the tube-wound heat exchangers 4 are connected in series or in parallel to each other, specifically:

The heat exchange device comprises a first tube-wound heat exchanger 401, a second tube-wound heat exchanger 402, and a third tube-wound heat exchanger 403; the tube passage of the first tube-wound heat exchanger 401 is connected in parallel to the tube passage of the second tube-wound heat exchanger 402, and the tube passage of the first tube-wound heat exchanger 401 and the tube passage of the second tube-wound heat exchanger 402 both receive the material and are connected to the inlet of the gas-liquid separation device 1; the tube passage of the third tube-wound heat exchanger 403 is connected in series to the tube passage of the first tube-wound heat exchanger 401; and a plurality of valves 6 are respectively disposed at the tube-pass inlet connecting tubes 45a and tube-pass outlet connecting tubes 45b of the adjacent tube-wound heat exchangers 4.

In this way, by only opening the valves 6 at the tube-pass inlet connecting tube 45a and the tube-pass outlet connecting tube 45b of the first tube-wound heat exchanger 401 or the second tube-wound heat exchanger 402, the same heating effect as the single tube-wound heat exchanger in Embodiment 1 can be achieved. By only closing the valves 6 at the tube-pass inlet connecting tube 45a and the tube-pass outlet connecting tube 45b of the second tube-wound heat exchanger 402, the series connection of the first tube-wound heat exchanger 401 to the third tube-wound heat exchanger 403 can be realized, so that the material firstly enters the tube passage of the third tube-wound heat exchanger 403 and then enters the tube passage of the first tube-wound heat exchanger 401 for heating.

Embodiment 3

Figure 9:
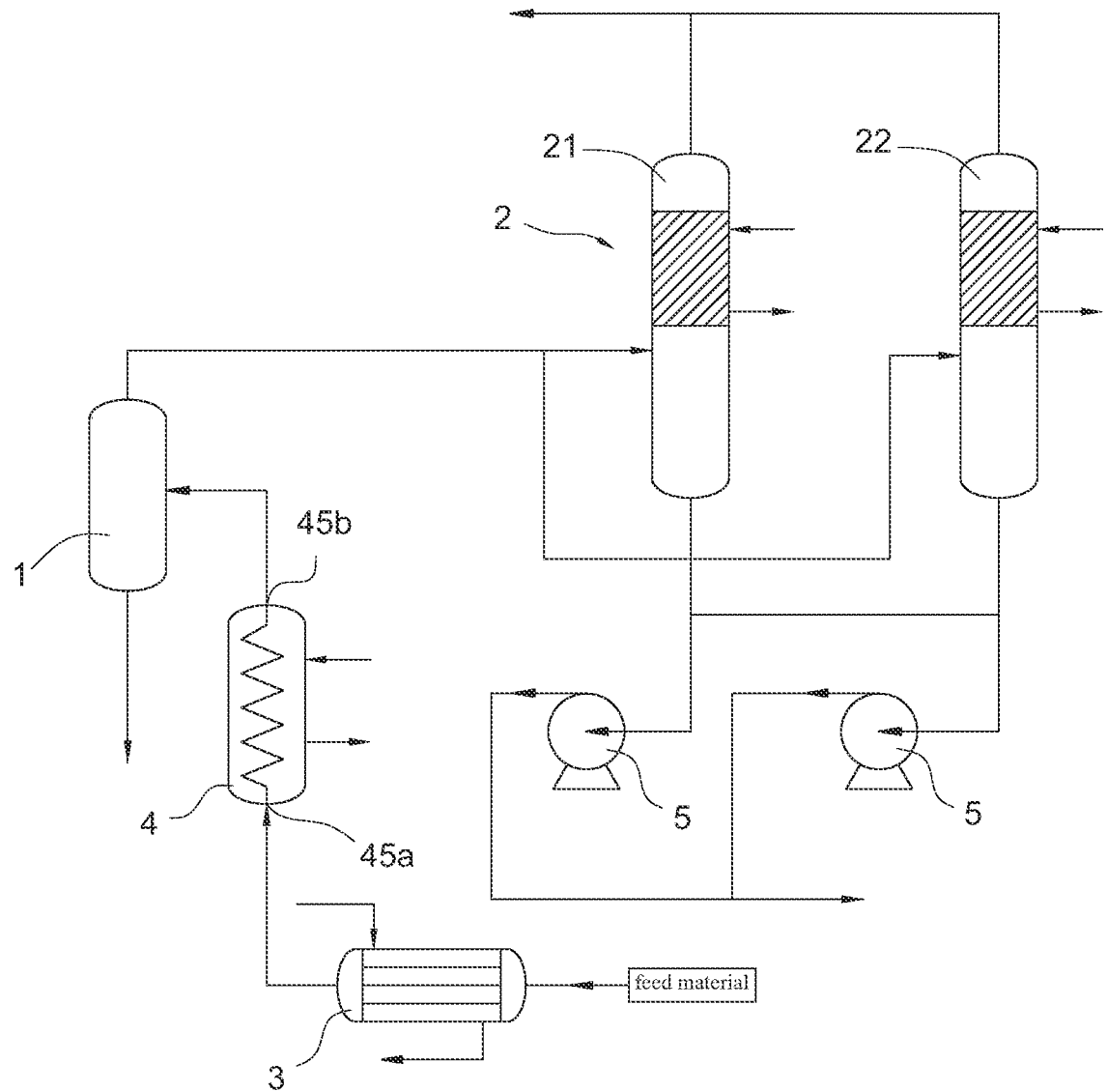
FIG. 9 is a diagram of a depolymerization system according to Embodiment 3 of the present invention.

FIG. 9 shows a third preferred embodiment of the depolymerization system according to the present invention. The depolymerization system is basically the same as that in Embodiment 1, the only difference is that, the heat exchange device in this embodiment further comprises a tubular heat exchanger 3 (having the same structure as the tubular heat exchanger in the prior art) having a tube passage for the material to pass through and a shell passage for a second heating medium to flow through; the tube passage of the tubular heat exchanger 3 is connected in series to the tube passage of the tube-wound heat exchanger 4, and the tube-pass inlet connecting tube 45a of the tube-wound heat exchanger 4 receives the material from the tube passage of the tubular heat exchanger 3. In this way, the material firstly enters the tube passage of the tubular heat exchanger 3 for primary heating, and then enters the tube passage of the tube-wound heat exchanger 4 for secondary heating.

Of course, the number of tube-wound heat exchangers in the present application is not limited to the above numbers, and there may be three or even more tube-wound heat exchangers connected in series. Considering the cost and the heat exchange efficiency, the solutions disclosed in the above embodiments are preferred. The user can make a choice according to actual working conditions.

The invention claimed is:

1. A depolymerization system with a tube-wound heat exchanger, comprising:
   a heat exchange device for heating a material, having a material output;
   a gas-liquid separation device (1) having an inlet and a gas output, connected to the material output of the heat exchange device; and
   a depolymerization device (2) connected to the gas output of the gas-liquid separation device (1);
   wherein,
   the heat exchange device comprises a tube-wound heat exchanger (4), a tubular heat exchanger (3) having a tube passage for the material to pass through and a shell passage for a second heating medium to flow through;
   the tube-wound heat exchanger (4) comprises:
   a shell-pass cylinder (41) having two ends;
   a first shell-pass connecting tube (42a) and a second shell-pass connecting tube (42b) both connected to the shell-pass cylinder (41);
   a first tube plate (43) and a second tube plate both attached to the two ends of the shell-pass cylinder (41);
   a first tube box (44) having a tube-pass inlet connecting tube (45a) disposed on the first tube plate (43);
   a second tube box having a tube-pass outlet connecting tube (45b) disposed on the second tube plate;
   a heat exchange tube (46) having two ends disposed inside the shell-pass cylinder (41);
   wherein, a shell passage for a first heating medium to flow through is formed by the first shell-pass connecting tube (42a), the second shell-pass connecting tube (42b) and the shell-pass cylinder (41);
   the heat exchange tube (46) is spirally wounded with multiple tube layers, the two ends of the heat exchange tube (46) is respectively connected to the first tube plate (43) and the second tube plate, and respectively communicated with the first tube box (44) and the second tube box;
   a tube passage for the material to pass through is formed by the first tube box (44), the second tube box and the heat exchange tube (46), and is connected in series to the tube passage of the tubular heat exchanger (3);
   the tube-pass inlet connecting tube (45a) receives the material from the tube passage of the tubular heat exchanger (3), and the tube-pass outlet connecting tube (45b) is connected to the inlet of the gas-liquid separation device (1).

2. The depolymerization system of claim 1, wherein the heat exchange device comprises at least two tube-wound heat exchangers (4), and the tube passages of the tube-wound heat exchangers (4) are connected in series or in parallel to each other.

3. The depolymerization system of claim 2, wherein the heat exchange device comprises a first tube-wound heat exchanger (401), a second tube-wound heat exchanger (402), and a third tube-wound heat exchanger (403);
   the tube passage of the first tube-wound heat exchanger (401) is connected in parallel to the tube passage of the second tube-wound heat exchanger (402), and the tube passage of the first tube-wound heat exchanger (401) and the tube passage of the second tube-wound heat exchanger (402) both receive the material and are connected to the inlet of the gas-liquid separation device (1);
   the tube passage of the third tube-wound heat exchanger (403) is connected in series to the tube passage of the first tube-wound heat exchanger (401); and
   a plurality of valves (6) are respectively disposed at the tube-pass inlet connecting tubes (45a) and tube-pass outlet connecting tubes (45b) of the adjacent tube-wound heat exchangers (4).

4. The depolymerization system of claim 1, wherein the central axis of the tube-pass inlet connecting tube (45a) coincides with the central axes of the first tube box (44) and the shell-pass cylinder (41).

5. The depolymerization system of claim 1, wherein a spiral angle of the heat exchange tube (46) in each tube layer is an included angle (a) between the spiral line and the central axis of the shell-pass cylinder (41), which gradually decreases from the tube layer on the inner side to the tube later on the outer side.

6. The depolymerization system of claim 1, wherein an edge manifold ring (47) is disposed in the first tube box (44), and is located on the outer side of the end of the heat exchanger tube (46) and adhered to the inner wall of the first tube box (44);
   a plurality of first dredge tubes (49a) are convexly disposed on an end face of the edge manifold ring (47) facing the heat exchange tube (46) at intervals in the circumferential direction, and the first dredge tubes (49a) extend into the heat exchange tube (46) in the tube layer on the outer side; or
   a global manifold plate (48) is disposed in the first tube box, and is located on the outer side of the end of the heat exchange tube (46), and the edge of the global manifold plate (48) is adhered to the inner wall of the first tube box (44);
   a plurality of through holes (480) for receiving the material are disposed on the global manifold plate (48) at intervals, a plurality of second dredge tubes (49b) are convexly disposed on an end face of the global manifold plate (48) facing the heat exchange tube (46) at intervals, and the second dredge tubes (49b) extend into the heat exchange tube (46) in each tube layer.

7. The depolymerization system of claim 6, wherein the ratio of the outer diameter of the first dredge tubes (49a) or second dredge tubes (49b) to the inner diameter of the heat exchange tube (46) is less than 3/8.

8. The depolymerization system of claim 6, wherein the through holes (480) are distributed on a plurality of concentric circumference lines using the medial axis of the global manifold plate (48) as a center, and the density of the through holes (480) on the concentric circumferential lines gradually increases from inside to outside.

* * * * *